United States Patent
Downey et al.

(10) Patent No.: US 6,179,265 B1
(45) Date of Patent: Jan. 30, 2001

(54) SINGLE HORIZONTAL DRIVE CONFIGURATION FOR A SEAT ADJUSTER

(75) Inventors: Hugh D. Downey, Barrie; Roger Freund, Port Sydney; Pascal Garrido, Gravehurst, all of (CA); Nills O. Olsson, Glen Ellyn, IL (US); Gregory David Collins, Gravenhurst (CA)

(73) Assignee: Dura Global Technologies Inc., Rochester Hills, MI (US)

( * ) Notice: Under 35 U.S.C. 154(b), the term of this patent shall be extended for 0 days.

(21) Appl. No.: 09/207,484

(22) Filed: Dec. 8, 1998

(51) Int. Cl.[7] ............................................. F16M 13/00
(52) U.S. Cl. ............................................. 248/429; 248/419
(58) Field of Search .................................. 248/429, 419, 248/422, 424; 297/344.17, 344.2, 341

(56) References Cited

U.S. PATENT DOCUMENTS

| | | | |
|---|---|---|---|
| 4,309,015 | * 1/1982 | Muhr | 248/396 |
| 5,224,749 | * 7/1993 | Gauger et al. | 296/65.1 |
| 5,275,457 | * 1/1994 | Satoh et al. | 296/65.1 |
| 5,280,987 | 1/1994 | Miller | 296/65.1 |
| 5,709,363 | * 1/1998 | Matsuhashi | 248/421 |
| 5,816,555 | * 10/1998 | Ito et al. | 248/429 |
| 5,871,195 | * 2/1999 | Gauger | 248/419 |
| 5,909,866 | * 6/1999 | Vaidyanathan et al. | 248/429 |
| 5,938,164 | * 8/1999 | Kargol et al. | 248/429 |
| 5,988,581 | * 11/1999 | Freund et al. | 248/429 |

* cited by examiner

*Primary Examiner*—Anita M. King
(74) *Attorney, Agent, or Firm*—Robert K. Roth

(57) ABSTRACT

A vehicle seat assembly includes a seat back supported with respect to a seat bottom and is attached to the vehicle by a mounting assembly. The mounting assembly has an inboard track assembly and an outboard track assembly that are both mounted to a vehicle structure with the track assemblies being spaced apart from one another. Each track assembly includes a first track and a second track supported for movement relative to the first track. The first and second tracks are preferably mounted in a vertical configuration. The seat bottom is supported on the second track for horizontal movement with the second track as seat position is adjusted. A single drive mechanism is supported on one of the inboard or outboard track assemblies. The drive mechanism includes a single drive member that is mounted between the inboard and outboard track assemblies. A truss structure extends between the inboard and outboard track assemblies to provide structural support for the seat assembly as seat position is adjusted.

19 Claims, 2 Drawing Sheets

SINGLE HORIZONTAL DRIVE CONFIGURATION FOR A SEAT ADJUSTER

BACKGROUND OF THE INVENTION

This application relates generally to a single horizontal drive assembly used in a power seat adjuster that provides a stable seat mount due to the use of a truss structure extending between seat track assemblies.

Seat track arrangements for mounting seats within vehicles are generally well known. Most arrangements provide for a seat to be moved or adjusted in forward and rearward directions within a vehicle along inboard and outboard track assemblies. The inboard track assembly is spaced apart from the outboard track assembly and both track assemblies include a first track member that is mounted to the vehicle and a second track member that is supported for movement relative to the first track member. The first and second track members are usually mounted in a horizontal configuration with bearing members located on the sides of the first and second tracks. The seat is adjusted in forward and rearward directions by sliding the second track members relative to the first track members along the bearing members.

Known power seat adjusters use a motor drive assembly including at least one bi-directional electric motor that rotates a pair of drive shafts extending outwardly from the motor to a gear assembly mounted on each of the second track members. In one known configuration, threaded shafts are mounted to the second track and extend longitudinally between the first and second tracks for both the inboard and outboard track assemblies. The motor drives the gear assembly and each gear assembly rotates its respective threaded shaft. A drive block or nut is mounted to each of the first tracks and threadingly receives the threaded shaft to cause reciprocal horizontal movement of the second track upon selective receipt of power from the motor and drive shafts.

One disadvantage of this known configuration is that two gear boxes are needed, two threaded shafts are needed, and two drive blocks are needed. The duplication of identical components increases the weight and the cost and requires a significant amount of packaging space.

Another disadvantage of having two threaded shafts, one mounted on the inboard track assembly and one mounted on the outboard track assembly, is that the shafts are difficult to synchronize, i.e., one threaded shaft is at one horizontal position while the other threaded shaft is at a different horizontal position. This can cause the seat to be misaligned within the vehicle, which is undesirable. Thus, assembly cost is high because it is difficult to assemble the seat adjuster such that the rotation of the inboard threaded shaft exactly corresponds to the outboard threaded shaft.

Another disadvantage with this known configuration is the difficulty of packaging the threaded shafts between the first and second track members in each of the inboard and outboard track assemblies. This configuration requires the track members to be large in order to accommodate the threaded shafts and the drive blocks between the two track members. This configuration takes up more packaging space underneath the seat.

Accordingly, it is desirable to provide a power seat adjuster that only has one horizontal drive mechanism mounted to one of the track assemblies to reduce the overall number of components and the overall weight of the seat adjuster, and which includes a drive member that is not centered between first and second track members. It is also desirable to provide a single horizontal drive mechanism with only one driving member for adjusting seat position, but which also provides a stable seat mount.

SUMMARY OF THE INVENTION

In general terms, a vehicle seat includes a seat bottom supported on mounting assembly that has a power seat adjuster for selectively moving the seat in a horizontal direction with respect to the vehicle. The mounting assembly includes an inboard track assembly that is spaced apart from an outboard track assembly. A single drive mechanism is mounted to one of the track assemblies. A truss structure extends between the two track assemblies to provide a stable seat mount.

In one embodiment, an assembly for mounting a seat within a vehicle includes an inboard track assembly defining an inboard longitudinal axis and an outboard track assembly defining an outboard longitudinal axis that is spaced apart from and generally parallel to the inboard longitudinal axis. The inboard and outboard track assemblies each include a first track and a second track supported for movement relative to the first track in a longitudinal direction. The first and second tracks are preferably mounted in a vertical configuration. A single drive motor assembly is supported by one of the inboard or outboard track assemblies for selectively moving the second track members relative to the first track members along the longitudinal axes. The assembly further includes a truss structure extending between the inboard and outboard track assemblies having at least one cross piece member. In a preferred embodiment, the truss structure includes a first cross piece and a second cross piece that are mounted at angles with respect to the inboard and outboard longitudinal axes.

The subject invention offers several advantages over prior art systems because it provides power seat adjuster that only uses a single drive mechanism while still providing a rigid and stable seat assembly by utilizing a truss system extending between track assemblies. The subject invention also decreases the number of components and is lighter and less expensive than prior art assemblies.

These and other features and advantages of the present invention will be best understood from the following specification and drawings, the following of which is a brief description.

DETAILED DESCRIPTION OF THE PREFERRED EMBODIMENT

Figure 1:
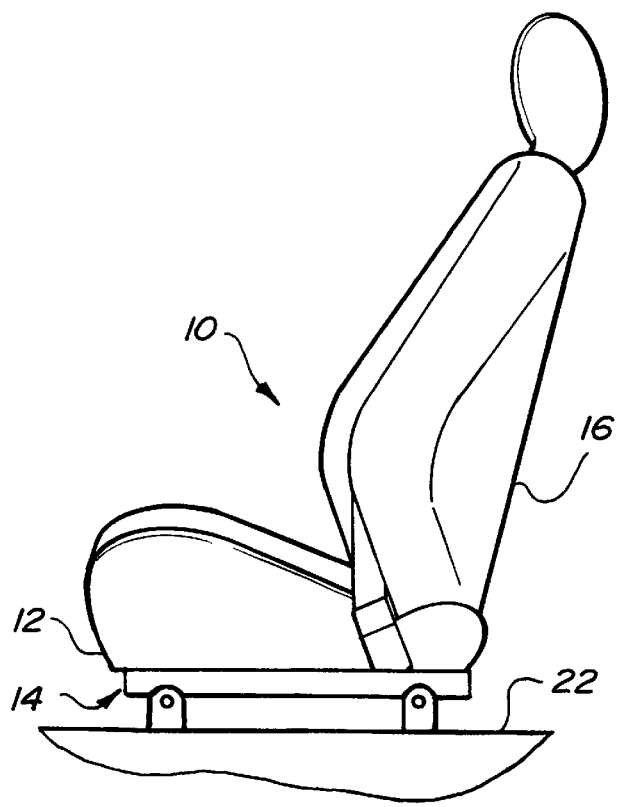
FIG. 1 is a perspective illustration of a seat with a seat track mounting assembly including the inventive drive mechanism and truss structure.

FIG. 1 illustrates a vehicle seat assembly 10. The seat assembly 10 includes a seat bottom 12 that is mounted within the vehicle on a mounting assembly 14. A seat back 16 is supported with respect to the seat bottom 12.

The mounting assembly 14 includes an inboard track assembly 18 and an outboard track assembly 20. The inboard 18 and outboard 20 track assemblies are mounted to a vehicle structure 22, such as a vehicle floor. The terms inboard and outboard are used in this description for clarity and illustration purposes only and cannot be considered limiting.

Figure 2:
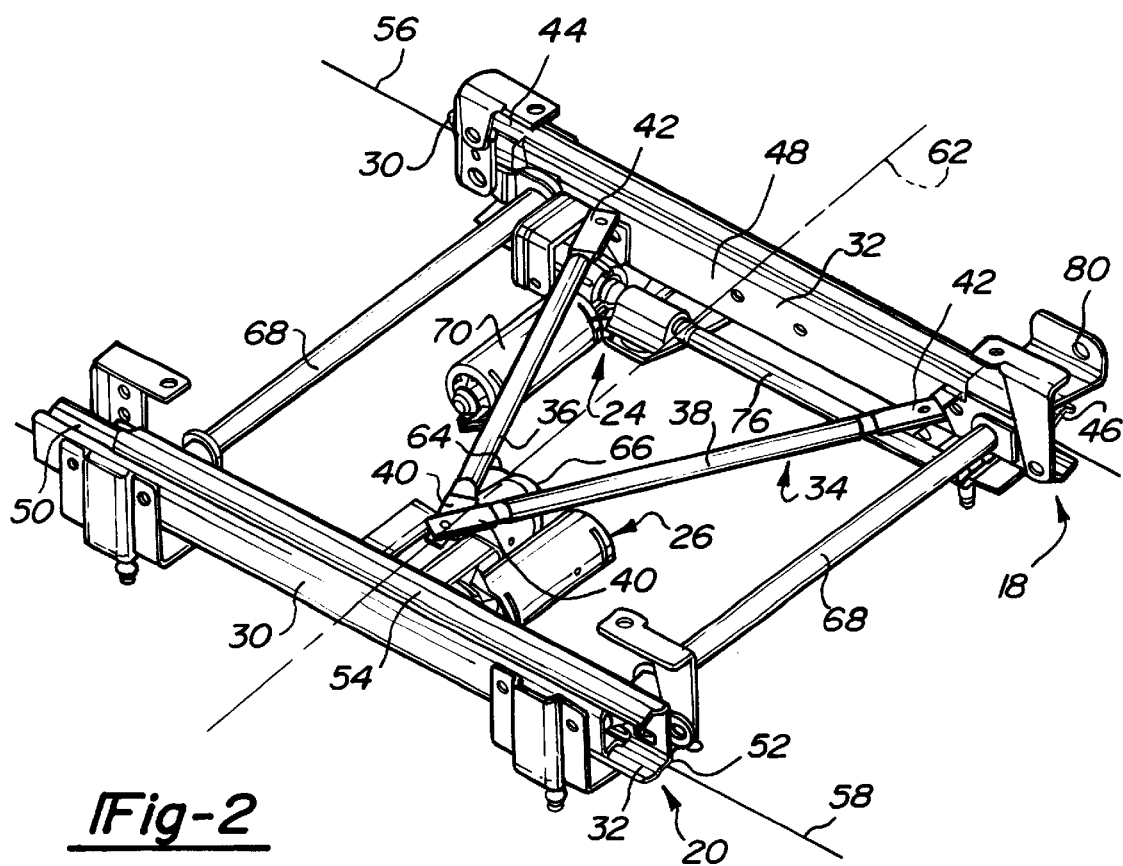
FIG. 2 is an enlarged perspective view of the seat track mounting assembly shown schematically in FIG. 1.

As shown in FIG. 2, the inboard 18 and outboard 20 track assemblies are spaced apart from one another and each include a first track 30 and a second track 32. Preferably, the first track 30 is a lower or outer track that is fixedly mounted to a frame of the vehicle, for example. The second track 32 is preferably an upper or inner track that is supported with respect to the lower track 30 so that the upper track 32 can be moved in a forward or rearward direction relative to the lower track 30. The terms inner, outer, forward, rearward, upper, and lower, as used in this description, are for illustration purposes only and cannot be considered limiting.

A horizontal drive motor assembly 24 is mounted to one of the inboard 18 or outboard 20 track assemblies. The horizontal drive motor assembly 24 is preferably mounted to the inboard track assembly 18 and for description purposes the mounting assembly 14 will be discussed as having this configuration. The horizontal drive motor assembly 24 is used to move the second tracks 32 with respect to the first tracks 30 to adjust the horizontal position of the seat. The horizontal drive motor assembly 24 includes a single drive mechanism that moves the second track 32 of the inboard track assembly 18 with outboard track assembly 20 being a slave track. This will be discussed in greater detail below.

The mounting assembly 14 also preferably includes a vertical drive motor assembly 26 mounted to one of the inboard 18 or outboard 20 track assemblies. The vertical drive motor assembly 26 adjusts the vertical position of the seat 10.

In order to provide a stable seat, the mounting assembly 14 includes a rigid structural assembly, shown generally at 34, that extends between the inboard 18 and outboard 20 track assemblies. The structural assembly 34 can include structural members supported by the track assemblies 18, 20 or can be formed as part of the seat pan. The use of the rigid structural assembly 34 allows a single horizontal drive motor assembly 24 to be used for the seat mounting assembly 14 while still providing a stable seat.

The inboard track assembly 18 has first end portion 44 and a second end portion 46. The horizontal drive mechanism 24 is preferably mounted near a central portion 48 of the inboard track assembly 18 between the first 44 and second 46 end portions. The outboard track assembly 20 has a first end portion 50, a second end portion 52, and a center portion 54 midway between the first 50 and second 52 end portions.

The rigid structural assembly 34 includes at least one cross piece that extends between the inboard 18 and outboard 20 tracks to provide a strong and stable mount as seat position is adjusted. As shown in FIG. 2, the rigid structural assembly 34 is preferably comprised of a first cross piece 36 and a second cross piece 38. The first 36 and second 38 cross pieces each have a first end 40 supported near a center portion of one of the inboard 18 or outboard 20 track assemblies and a second end 42 supported near an end portion of the other of the inboard 18 or outboard 20 track assemblies.

As discussed above, the rigid structural assembly 34 can include separate cross pieces members 36, 38, or the cross pieces members can be integrally formed together. For example, the first and second cross pieces can be integrally formed as a single piece having a center portion mounted near the center of one of the track assemblies with a first leg portion 36 extending toward an end of the other track and a second leg potion 38 extending toward an opposite end of the other track.

In the preferred embodiment, the rigid structural assembly 34 includes two cross pieces 36, 38. The first ends 40 of the first 36 and second 38 cross pieces are preferably mounted near the center portion 54 of the outboard track assembly. The first cross piece 36 preferably has the second end 42 mounted near the first end portion 44 of the inboard track assembly 18 while the second cross piece 38 preferably has the second end 42 mounted near the second end portion 46 of the inboard track assembly. This mounting configuration provides a stable seat mount and eliminates the rocking and misalignment problems inherent in prior art seat mounts with two horizontal drive motor mechanisms, one installed in each track assembly. While two cross pieces 36, 38 are preferred, it should be understood that additional cross pieces could be used to increase stability.

The inboard track assembly 18 defines an inboard longitudinal axis 56 and the outboard track assembly 20 defines an outboard longitudinal axis 58. The inboard 56 and outboard 58 longitudinal axes are spaced apart from one another and are generally parallel to each other. The second tracks 32 move with respect to the first tracks 30 along the respective longitudinal axis 56, 58 when selectively powered by the horizontal drive motor assembly 24.

The rigid structural assembly 34 includes at least one component that is mounted transversely to the inboard 56 and outboard 58 longitudinal axes. As described above in the preferred embodiment, the rigid structure assembly 34 includes at least two cross pieces 36, 38 that extend between the track assemblies 18, 20. The cross pieces 36, 38 are mounted at an angle with respect to the inboard 56 and outboard 58 longitudinal axes. While two cross pieces 36, 38 are shown, it should be understood that more than two cross pieces could be used in the rigid structure assembly 34 to provide additional support.

The rigid structural assembly 34 is basically a truss structure that extends between the inboard 18 and outboard 20 track assemblies to provide structural support for the seat assembly 10. The first 36 and second 38 cross pieces are tubular members, however, the cross pieces 36, 38 could be solid structural members if additional support is needed.

As shown in FIG. 2, the inboard 18 and outboard 20 track assemblies define a central horizontal axis 62 that is generally perpendicular to the inboard 56 an outboard 58 longitudinal axes and extends between the center portions 48, 54 of the inboard 18 and outboard 20 track assemblies.

The first 36 and second 38 cross pieces of the truss structure 34 include first ends 40 supported on one of the track assemblies 18, 20 adjacent to an intersection of the horizontal axis 62 with the inboard 56 or outboard 58 longitudinal axis. The first cross piece 36 is mounted at a first angle 64 with respect to the horizontal axis 62 and the second cross piece 38 is mounted at a second angle 66 with respect to the horizontal axis 62. Preferably the first 36 and second 38 cross pieces are mounted such that the first 64 and second 66 angles are equal.

As shown in FIG. 2, the inboard 18 and outboard 20 track assemblies are vertically mounted with respect to the horizontal drive motor assembly. The inboard 18 and outboard 20 track assemblies each include a first bearing surface located above a central horizontal axis extending between the inboard and outboard track assemblies and a second bearing surface located below the central horizontal axis. An example of this configuration is disclosed in a co-pending application entitled "Improved Profile For Seat Track Assembly" filed on Nov. 11, 1998 and assigned to the same assignee as this application, herein incorporated by reference. While a vertical orientation of the tracks 18, 20 is preferred other mounting configurations can be used.

At least one torque tube 68 extends between the inboard and outboard track assemblies. Preferably there is one torque tube 68 mounted near the front of the seat 10 and one torque tube 68 mounted near the rear of the seat 10. The torque tubes 68 work in combination with the vertical drive motor assembly 26 to vertically adjust seat position. Due to the vertical orientation of the tracks 30, 32, the torque tubes 68 are preferably inserted directly into the second track 32. Thus, there is a bearing surface on the exterior surface of the torque tube 68 that engages a corresponding bearing surface on the second track 32.

Figure 3:
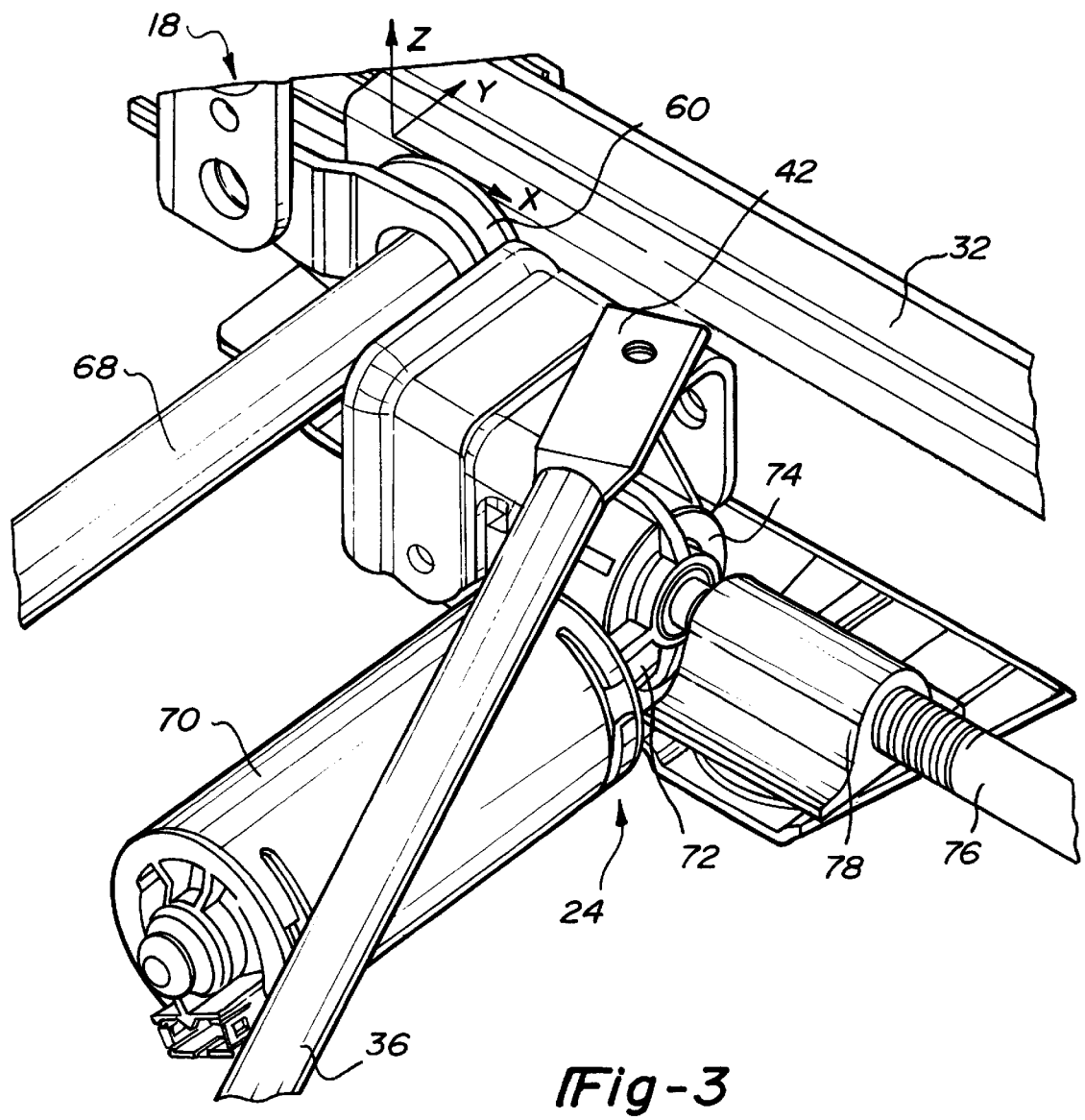
FIG. 3 is an enlarged view, partially cut away, of the mounting assembly shown in FIG. 2.

The torque tube 68 also supports a motor drive bracket 60 used to connect the horizontal drive motor assembly 24 to the inboard track assembly 18, as shown in FIG. 3. The horizontal drive motor assembly 24 includes an electric motor 70 mounted at an angle with respect to the inboard and outboard longitudinal axes 56, 58. The electric motor 70 is preferably mounted perpendicularly to the inboard longitudinal axis 58 and includes an output shaft 72 that is operably connected to a gear assembly 74. The horizontal drive motor assembly 24 further includes single a threaded shaft 76 mounted between the inboard 18 and outboard 20 track assemblies and a drive nut assembly 78 driven by the electric motor 70 along the threaded shaft 76. The threaded shaft 76 is generally parallel to the inboard 56 and outboard 58 longitudinal axes.

The threaded shaft 76 is preferably mounted closer to the inboard track assembly than the outboard track assembly 20. Mounting the shaft 76 between the inboard 18 and outboard 20 track assemblies rather than between the first 30 and second tracks 32 allows the track assemblies 18, 20 to become more compact. The tracks 30, 32 can be moved closer together because a threaded shaft and drive block or drive not are no longer supported on the second track 32 between the first 30 and second 32 tracks. This increases available packaging space for other seat components.

Mounting the threaded shaft 76 between the inboard 18 and outboard 20 track assemblies also reduces the number of components for the seat adjuster. A single shaft 76 can be used to drive both track assemblies 18, 20 instead of having two shafts, one mounted to each track assembly.

The threaded shaft 76 is mounted to the second track 32 and the drive nut 78 is mounted to the first track 30. Thus, when the motor 70 is selectively powered by a seat occupant, power is supplied to the gear assembly 74 via the output shaft 72. The gear assembly 74 drives the drive nut assembly 78 along the threaded shaft 76 resulting in the seat position being adjusted horizontally along the axes 56, 58.

Some seat assemblies 10 also include a seat belt assembly (not shown) that is supported solely by the seat assembly 10. A seat occupant who is belted into the seat assembly will exert a force on the seat assembly when the occupant experiences a deceleration load. This is known as an "all belts to seat" load. This seat load is transferred to the mounting assembly 14. Thus, the mounting assemblies 14 must be strong enough to securely hold the seat assembly in place and prevent the seat 10 from separating from the vehicle during a sudden deceleration.

Another advantage of using the horizontal drive motor assembly 24 with the rigid structural assembly 34 is that the mounting assembly 14 can accommodate "all belts to seat" loading. As shown in FIG. 2, at least one seat belt bracket 80 can be mounted to one of the inboard 18 or outboard 20 track assemblies. The track assemblies 18, 20 are strong enough to handle the load transferred through the seat belt bracket 80. While the mounting assembly 14 can be used in an "all belts to seat" configuration, the mounting assembly with the horizontal drive motor assembly 24 and the rigid structural assembly 34 can also be used in other seat belt mounting configurations.

The subject invention provides a power seat adjuster that uses only one horizontal drive motor 24 mounted to one of the track assemblies 18 or 20 yet provides a seat mount that is compact, stable, and which eliminates misalignment problems. The use of only one horizontal drive motor assembly 24 also makes the seat adjuster is lighter by using fewer components, which makes the adjuster less expensive and increases available packaging space underneath the seat.

Preferred embodiments of this invention have been disclosed, however, a worker of ordinary skill in the art would recognize that certain modifications would come within the scope of this invention. For that reason, the following claims should be studied to determine the true scope and content of this invention.

What is claimed is:

1. A drive apparatus for a power seat adjuster, comprising, in combination:

an inboard track assembly;

an outboard track assembly laterally spaced from said inboard track assembly;

said inboard and outboard track assemblies each including a first track and a second track supported for movement relative to said first track in a longitudinal direction;

a drive motor assembly supported by one of said inboard or outboard track assemblies for selectively moving said second track members relative to said first track members; and a truss structure extending between said inboard and outboard track assemblies for providing stability as said second tracks move with respect to said first tracks;

wherein said truss structure is comprised of a first cross piece and a second cross piece, said first and second cross pieces each having a first end supported near a center portion of one of said inboard or outboard track assemblies and a second end supported near an end portion of the other of said inboard or outboard track assemblies.

2. An apparatus as recited in claim 1 wherein the drive motor assembly has a drive motor and said inboard and outboard track assemblies are vertically mounted with respect to said drive motor.

3. An apparatus as recited in claim 2 wherein said inboard and outboard track assemblies each include a first bearing surface located above a central horizontal axis extending between said inboard and outboard track assemblies and a second bearing surface located below said central horizontal axis.

4. An apparatus as recited in claim 1 wherein said second end of said first cross piece is supported near a front end portion of the other of said inboard or outboard track assemblies and said second end of said second cross piece is supported near a rear end portion of the other of said inboard or outboard track assemblies.

5. An apparatus as recited in claim 1 wherein said inboard and outboard track assemblies define inboard and outboard longitudinal axes, respectively, said first and second cross pieces being mounted transversely to said inboard and outboard longitudinal axes.

6. An apparatus as recited in claim 1 wherein said truss structure is comprised of at least one cross piece member with a first mount supported near one of said inboard or outboard track assemblies and a pair of second mounts supported by the other of said inboard or outboard track assemblies.

7. An apparatus as recited in claim 1 wherein said drive motor assembly includes an electric motor having at least one component mounted transversely to said inboard and outboard track assemblies, a threaded shaft mounted between and generally parallel to said inboard and outboard track assemblies for movement with said second tracks, and a drive nut driven by said electric motor along said threaded shaft.

8. An assembly for mounting a seat within a vehicle, comprising:

an inboard track assembly defining an inboard longitudinal axis;

an outboard track assembly defining an outboard longitudinal axis spaced apart from and generally parallel to said inboard longitudinal axis;

said inboard and outboard track assemblies each including a first track and a second track supported for movement relative to said first track in a longitudinal direction;

a single drive motor assembly supported by one of said inboard or outboard track assemblies for selectively moving said second track members relative to said first track members along said longitudinal axes; and a truss structure extending between said inboard and outboard track assemblies with at least one cross piece member having a first mounting portion supported adjacent to a center one of said inboard or outboard track assemblies, a second mounting portion located adjacent to an end of the other of said inboard or outboard track assemblies, and a third mounting portion located adjacent to an opposite end of the other of said inboard or outboard track assemblies.

9. An assembly as recited in claim 8 wherein the single drive motor assembly comprises a drive motor and the inboard and outboard track assemblies are vertically mounted with respect to said drive motor.

10. An assembly as recited in claim 8 wherein said truss structure includes at least a first cross piece and a second cross piece, said first and second cross pieces being mounted at an angle with respect to said inboard and outboard longitudinal axes.

11. An assembly as recited in claim 8 including at least one seat belt bracket supported by one of said inboard or outboard track assemblies.

12. An assembly as recited in claim 8 wherein said drive motor assembly includes a threaded shaft mounted between said inboard and outboard track assemblies, said threaded shaft being generally parallel to said inboard and outboard longitudinal axes.

13. An assembly as recited in claim 12 wherein said drive motor assembly includes an electric motor mounted transversely to said longitudinal axes and a drive nut driven by said motor along said threaded shaft for moving said second track relative to said first track.

14. An assembly as recited in claim 13 wherein said threaded shaft is mounted to said second track and said drive nut is mounted to said first track.

15. A vehicle seat assembly comprising, in combination:

a seat bottom;

an inboard track assembly adapted to be mounted to a vehicle structure and defining an inboard longitudinal axis;

an outboard track assembly adapted to be mounted to the vehicle structure and spaced laterally from said inboard track assembly, said outboard track assembly defining an outboard longitudinal axis that is generally parallel to said inboard longitudinal axis;

said inboard and outboard track assemblies each comprising a first track and a second track supported for movement relative to said first track along said respective longitudinal axis, said seat bottom being supported on said second track for movement with said second track;

a drive motor assembly supported by one of said inboard or outboard track assemblies comprising an electric motor having at least one component mounted transversely to said longitudinal axes, a threaded shaft mounted to one of said second tracks between said inboard and outboard track assemblies, and a drive nut mounted to said corresponding first track, said drive motor assembly for selectively moving said second track members relative to said first track members along said longitudinal axes as said motor drives said drive nut along said threaded shaft; and a truss structure extending between said inboard and outboard track assemblies having at least a first cross piece and a second cross piece wherein said first and second cross pieces are mounted at an angle with respect to said inboard and outboard longitudinal axes to provide stability.

16. An assembly as recited in claim 15 wherein said inboard and outboard track assemblies define a central horizontal axis that is perpendicular to said inboard an outboard longitudinal axes, said first and second cross pieces each having a first end supported on one of said inboard or outboard track assemblies adjacent to an intersection of said horizontal axis with said inboard or outboard longitudinal axis.

17. An assembly as recited in claim 16 wherein said first cross piece is mounted at a first angle with respect to said horizontal axis and said second cross piece is mounted at a second angle with respect to said horizontal axis.

18. A seat assembly as recited in claim 17 wherein said first and second angles are equal.

19. A seat assembly as recited in claim 15 wherein said first cross piece has a first end supported near a center portion of one of said inboard or outboard track assemblies and a second end supported near an end portion of the other of said inboard or outboard track assemblies and said second cross piece has a third end supported near said center portion and a fourth end supported near an opposite end portion of the other of said inboard or outboard track assemblies.

* * * * *